United States Patent [19]

Poppinger et al.

[11] 3,999,114
[45] Dec. 21, 1976

[54] CONTROL UNIT FOR A CONVERTER

[75] Inventors: Herbert Poppinger; Ludwig Schick, both of Erlangen, Germany

[73] Assignee: Siemens Aktiengesellschaft, Munich, Germany

[22] Filed: Oct. 30, 1975

[21] Appl. No.: 627,340

[30] Foreign Application Priority Data

Nov. 4, 1974 Germany .......................... 2452228

[52] U.S. Cl. ................................... 321/47; 321/18
[51] Int. Cl.² ........................................ H02M 1/08
[58] Field of Search ............. 321/5, 12, 13, 38, 47; 307/252 UA

[56] References Cited
UNITED STATES PATENTS

| | | | |
|---|---|---|---|
| 3,648,148 | 3/1972 | Bechet et al. .......................... | 321/5 |
| 3,683,262 | 8/1972 | Neuffer et al. .......................... | 321/5 |
| 3,932,766 | 1/1976 | Kudeljan et al. ............ | 307/252 UA |

Primary Examiner—William H. Beha, Jr.
Attorney, Agent, or Firm—Kenyon & Kenyon Reilly Carr & Chapin

[57] ABSTRACT

A control unit for an externally commutated converter of the type which forms firing pulses for the converter rectifiers from a comparison of a synchronization voltage and a variable d.c. voltage in which the synchronizing voltage is fed to an amplifier followed by a limiter and integrator for smoothing purposes with the output of the integrator fed back to the input of the amplifier. In the simplest embodiment the limiting is accomplished through saturation of the amplifier. In another embodiment an additional integrator is provided, the output of which is coupled back to the output of the amplifier through a pair of diodes in parallel with opposite polarity.

8 Claims, 5 Drawing Figures

Fig.1

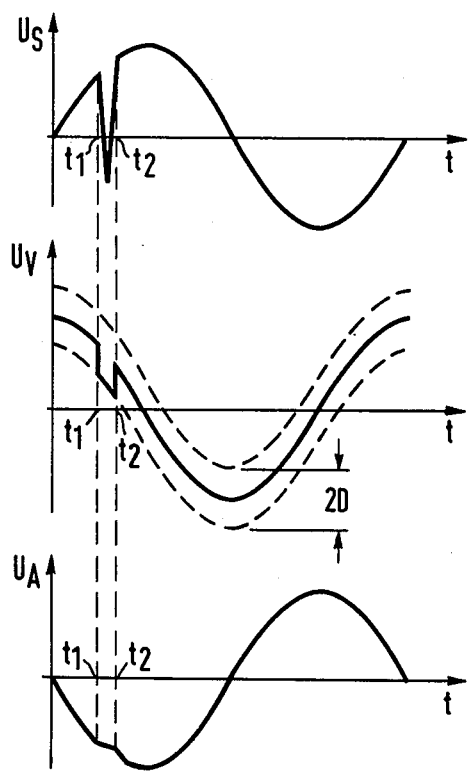
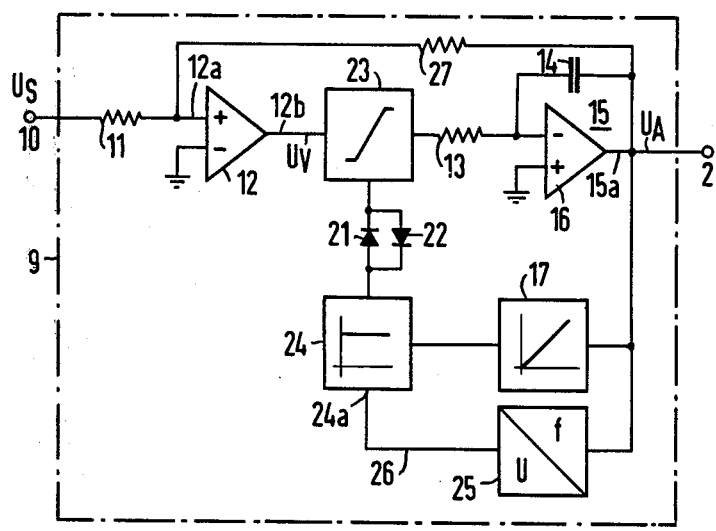
Fig. 4
Fig. 5

CONTROL UNIT FOR A CONVERTER

BACKGROUND OF THE INVENTION

This invention relates to control units for externally commutated converters in general and more particularly to an improved control unit which includes means for smoothing the synchronizing voltage provided in the control unit.

Control units for externally commutated converters are well known in the art. For example, see the book "Line-Commutated Converts" by G. Möltgen, published by Siemens AG and Pitman Publishing 1972, Chapter 8, particularly pages 301 and 307 and the book "Thyristor Phase-Control Converters and Cyclo Converters" by B. R. Pelly [Wily Interscience, 1971]. Also see DIN, 41,750 sheet 7, page 4. In these prior art control units, synchronization is a problem. In many cases they operate based on a zero crossing of a reference voltage, which in many cases is the line voltage. If harmonics are present on the line voltage, detection of proper zero crossing becomes difficult. In some cases the zero crossing can be shifted by several degrees. In very unfavorable cases a plurality of zero crossing can occur one after the other particularly where there are commutation dips in the line voltage caused by other converters. Thus, the operation of control units of this nature is quite unsatisfactory particularly in power supply systems with variable frequency and a heavy distortion of the line voltage waveshape. To remedy this situation, the use of R-C, L-C or bandpass filters is known. Such filters are described in the above mentioned references for use in smoothing the synchronization voltage. However, these filters have high cost, the chokes being quite expensive. In addition, they take up a great deal of space and are not always completely effective. Furthermore, they lead to phase shifts in the case of a frequency change so they cannot be used in networks of different frequency. In other words, the system with a filter designed for 50 Hz cannot be used in a 60 Hz system without readjustment or replacement of parts.

In view of these difficulties, the need for an improved method of smoothing a synchronizing voltage for use in a control unit for an externally controlled converter which is primarily frequency independent becomes evident.

SUMMARY OF THE INVENTION

The present invention provides such a system. In accordance with the present invention the problem is solved by feeding the synchronizing voltage to an amplifier followed by limiting means and a first integrator. The output of the first integrator is fed back to the input of the amplifier. The output of this first integrator is also connected to a conventional comparison stage used in deriving the firing pulses for the converter, to provide the synchronizing voltage input thereto.

With the control unit of the present invention, a closed control loop is used for smoothing the synchronization voltage. This unit follows sudden or short time changes of the synchronization voltage only very sluggishly. As a result, smoothing of the synchronization voltage which is frequency independent, since phase shift does not occur, is obtained. In addition, the smoothing of the synchronization voltage can be realized with simple circuits and these circuits can be massed produced in modular form.

In accordance with the present invention, it is advantageous to provide an amplifier having high gain which can be driven to saturation. This amplifier may then be used to provide the necessary limiting through saturation of the amplifier. This results in an even more simplified design. Typically, the amplifier and integrator will be implemented using conventional commercially available operational amplifiers. In the disclosed embodiment, the synchronization voltage is fed to non-inverting input of the amplifier. In accordance with a further embodiment of the present invention the output of the first integrator is followed by a second integrator. The output of the second integrator is coupled back through parallel diodes with opposite polarity to the output of the amplifier. The second integrator is designed such that its output voltage is approximately equal to the output voltage of the amplifier. As a result, short term or sudden changes of the output of the amplifier are limited to the threshold values of the diodes. This results in a further smoothing of the synchronization voltage without complicated circuitry. As disclosed, the second integrator may be an R-C member having its resistor coupled to the output of the first integrator with the capacity of the capacitor chosen to be large enough that the voltage drop across it is small as compared to the voltage at the output of the first integrator and approximately equal to the voltage at the output of the amplifier. As a result, a second integrator using simple, low cost components and which meets all the above noted requirements is obtained.

In accordance with a further illustrated embodiment, a linear amplifier may be inserted between the second integrator and the diodes. This will preferably be a variable gain amplifier. Furthermore, a function generator is provided which generates a variable d.c. voltage which is a function of the frequency of the output voltage of the first integrator. This output is fed to the linear amplifier to change its gain. The function generator may be implemented in simple fashion using a conventional frequency to voltage converter. With this embodiment, limiting is controlled as a function of frequency and an optimum degree of suppression of interference voltages which is frequency independent over wide ranges is obtained. The limitation of frequency response which must be tolerated if limitation is to be accomplished by the second integrator, is largely eliminated in this embodiment.

BRIEF DESCRIPTION OF THE DRAWINGS

FIG. 4 is a waveform diagram illustrating operation of the embodiment of FIG. 3.

FIG. 5 is a circuit diagram illustrating a third embodiment of the present invention in which a linear amplifier and function generator are utilized to obtain a circuit which is largely frequency independent.

DETAILED DESCRIPTION OF THE PREFERRED EMBODIMENT

Figure 1:
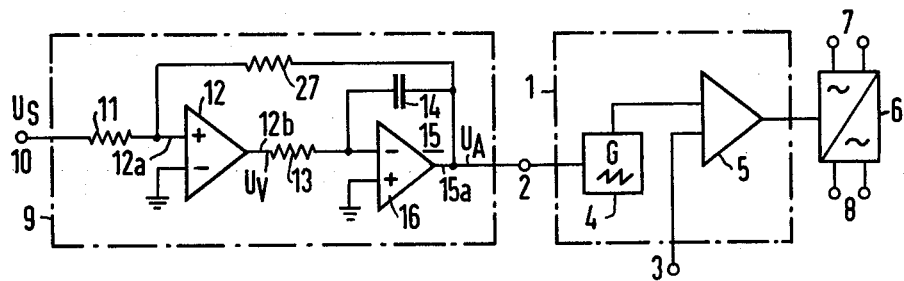
FIG. 1 is a circuit diagram illustrating a first and simplest embodiment of the circuit of the present invention.

FIG. 1 is a schematic-circuit diagram of a first embodiment of the present invention. Shown in a conventional pulse generator stage 1 having its output coupled to a converter 6 for firing the controlled rectifiers, e.g. thyristors, therein. The converter is an a.c. to a.c. converter and obtains an input on the line 7 which is converted into d.c. and then back a.c. at a different frequency. The final output is provided at the terminals 8. The pulse generator 1 has a synchronizing voltage fed to it at the terminal 2. The synchronizing voltage is used, for example, to trigger a sawtooth generator 4 which generates a rising voltage with each zero crossing, for example. The sawtooth output of the generator 4 is provided as one input to a comparator 5 having a reference input at its other terminal 3. Each time the two become equal an appropriate firing pulse is generated. i.e. each time the sawtooth voltage crosses the preset level at terminal 3 a voltage pulse is generated. These pulses, after transforming and amplification in conventional modules, not shown on the drawing, are fed as firing pulses to the thyristors in the converter 6. It is also possible in other known control units to use the synchronization voltage directly causing it to interact in a comparator with the preset reference voltage on the terminal 3.

The present invention provides a unit 9 for smoothing the synchronization voltage which is to be fed to the terminal 2. The basic synchronization voltage designated US, which may, for example, be the line voltage, is fed to the input terminal 10 of the smoothing means 9. This voltage is coupled through a resistor 11 to the non-inverting input 12a of an operational amplifier 12 which has its inverting input grounded. The output of the amplifier 12, designated as the voltage $U_V$ on line 12b is coupled through a resistor 13 to the inverting input of an amplifier 16 with a feedback capacitor 14 between its output and inverting input forming an integrator 15. The output of the integrator 15 on line 15a and designated as the voltage $U_A$ is fed back through a resistor 27 to the non-inverting input of the amplifier 12. The output of the integrator 15 on line 15a is also coupled to the terminal 2 of the pulse generator 1.

The smoothing means 9 is a closed loop with the voltage $U_S$ as the primary control input and the output $U_A$ as the secondary control input. The gain of the control loop is given by the ratio $R_{27}/R_{11}$ where $R_{27}$ is the resistance of resistor 27 and $R_{11}$ is the resistance of resistor 11.

A sine voltage $U_S$ equals to $\hat{U}_S$ sine $\omega t$ at the input thus produces a sine voltage $U_A = -(R_{27}/R_{11}) \hat{U}_S$ at the output of 15a of the integrator 15. The ^ symbol represents the peak voltage. At the same time a voltage $U_V = \hat{U}_V$ cosing $\omega t$ is present at the output 12b of amplifier 12. In the case of a sudden step-like change of synchronization voltage $U_S$, such as that caused by commutation dips, the primary and secondary control inputs at the input 12a of amplifier 12 will no longer be in agreement. Because of the high gain of the operational amplifier 12, the output voltage $U_V$ of the amplifier goes to the saturation level reaching its maximum possible value $\hat{U}_{Vmax}$. Thus, the amplifier 12 acts as a limiter. It will be recognized by those skilled in the art that the same effect can be achieved by inserting a limiter of conventional design between the amplifier 12 and integrator 15. In either case, the output voltage should be limited to a voltage value $U_V$ which is only slightly larger than the peak value of the undisturbed synchronizing voltage being transmitted. Because of this limitation, the integrator 15 receives a constant input voltage causing its output voltage $U_A$ to increase linearly until the secondary control input has again reached the primary control input or until the disturbance is over.

Figure 2:
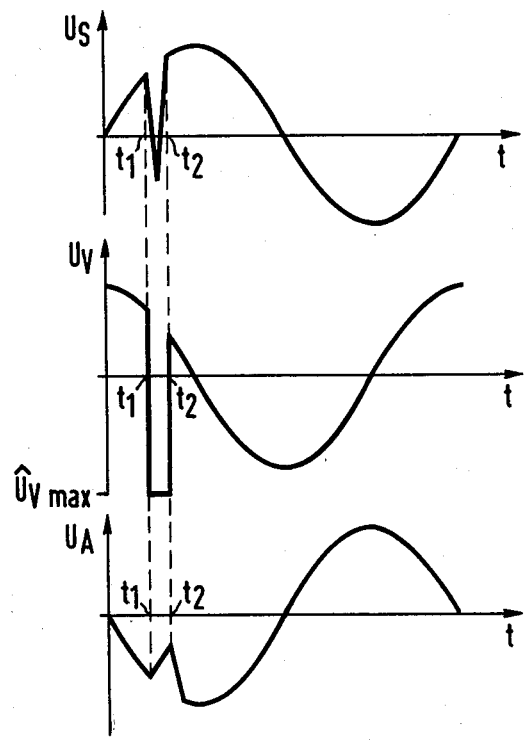
FIG. 2 is a waveform diagram illustrating the operation of the circuit of FIG. 1.

What occurs during a disturbance is illustrated in FIG. 2 where the various voltages are plotted with respect to time. Shown in the upper part of the figure is a commutation dip in the input voltage $U_S$ beginning at the time $t_1$ and ending at the time $t_2$. Because of the high gain of the amplifier 12, this disturbance results in a negative saturation between the time $t_1$ and $t_2$. This is shown on the second figure. As illustrated, the voltage is limited to $\hat{U}_{Vmax}$. This occurs at the saturation of the amplifier 12, or if there is a separate limiting stage in that stage. At the integrator, the voltage dips linearly between the times $t_1$ and $t_2$ and then gradually regains its proper value. The slope between the times $t_1$ and $t_2$ is determined by the quantities $R_{13}$, $C_{14}$ and $U_{Vmax}$ where $R_{13}$ is the resistance of the resistor 13 and $C_{14}$ the capacitor 14. From the shape of the voltage $U_A$ on FIG. 2 it is clear that the commutation break is compensated to a large degree. In other words, it is not of sufficient magnitude to have any effect on the pulse generator 1. This filtering of the synchronization voltage takes place independently of frequency. i.e. without phase shift. As a result, the voltage $U_A$ can fed to the pulse generator as a smooth synchronization voltage. This results in a frequency independent control of the converter 6 which may be, for example, a line commutated converter.

The upper frequency limit $f_{max}$ of the controlled system is defined by the following relationship:

$$f_{max} = \hat{U}_{Vmax} (2\pi \cdot R_{13} \cdot C_{14} \cdot \hat{U}_A) \qquad 1.$$

In order to keep the effect of the interference voltage small, a ratio of the upper frequency limit to the operating frequency $f$ of $(f_{max}/f)$ less than 1.5 has found to be of advantage.

In the circuit of FIG. 1, limiting is to a constant voltage value. The effects of an interference voltage can be further reduced if instead of limiting to a fixed value a voltage which is an image of the voltage $U_V$ under normal circumstance is used. A circuit for accomplishing this shown on FIG. 3. In this embodiment, the output 15 is followed by a further integrator 17 implemented, in the example of FIG. 3, with a R-C member comprising resistor 18 and capacitor 19. The resistor 18 is connected to the output 15a of the integrator 15 and the capacitor 19 coupled to ground. The output of the integrator which appears at the junction point 20 of the resistor 18 and capacitor 19 is coupled through diodes 21 and 22 in parallel with reverse polarities to the input of a limiter 23 having its signal input coupled to the output 12b of amplifier 12. The output of the limiter 23 is coupled through the resistor 13 to the input of the integrator 15. The limiter circuit 23 may be implemented in conventional fashion. For example, a circuit such as that shown on page 59, paragraph II. 43 in the publication Applications Manual for Computing Amplifiers for Modeling Measuring, Manipulating and Much Else (Philbric Research Inc. 1966) may be used with the voltage through the diodes 21 and 22 used as a reference rather than a fixed reference voltage value. Through this arrangement, interference voltages are limited to a voltage having a waveform which is approximately the same as the undisturbed waveform $U_V$. However, a limitation of the frequency response must be tolerated. It is assumed that the voltage $U_A$ is a function of sine $\omega t$ and voltage $U_V$ a function of cosine $\omega t$.

The integrator 17 develops a voltage from the output voltage $U_A$ which is present at the integrator 15. This is coupled through the diodes 21 and 22 as the limiting voltage at the limitor 23. Since this is an integrator the voltage present thereon will be a function of cosine $\omega t$. The integrator 17 is designed so that the voltage $U_{19}$ across the capacitor 19 is at least approximately equal to the amplifier output voltage $U_V$. To obtain with the resistor 18 and capacitor 19 a voltage which is a function of cosine $\omega t$, i.e. it is phase shifted approximately 90° with respect to the voltage $U_A$, the ratio ($U_A/U_{19}$) must be very large. This can be accomplished by using a correspondingly large capacitor 19. As a result, the voltage $U_{19}$ at the capacitor 19 will be very small and in the order of magnitude of the output voltage $U_V$ of the amplifier 12. With an undisturbed sine voltage at the input 10, limitation of cosine output does not take place since $U_V$ is equal to $U_{19}$. These two voltages are thus decoupled through the diode threshold values D of the diodes 21 and 22. If a disturbance occurs at the input 10, the voltage can change only by an amount determined by the diode thresholds. After changing that amount, it will be limited once the diode begins to conduct. As a result, the effect felt on the final output sine $U_A$ is minimal. This is a direct result of the fact that the linear curve sections obtained through integration of the disturbance are very small because of the small input voltage of the integrating device 15.

Figure 3:
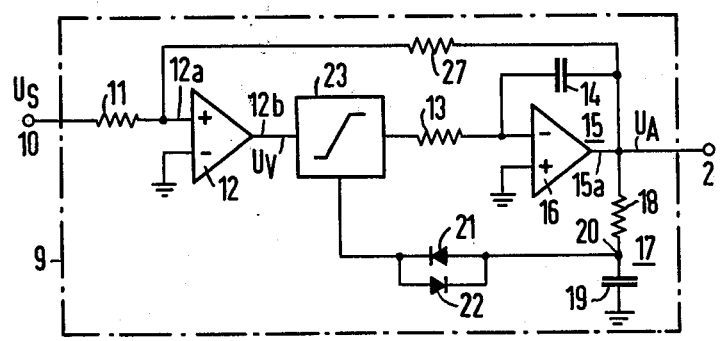
FIG. 3 is a circuit diagram illustrating a second embodiment of the present invention utilizing a second integrator.

FIG. 4 is a waveform diagram illustrating operation with the circuit of FIG. 3. Once again the three voltages $U_S$, $U_V$ and $U_A$ are plotted with respect to the time $t$. Once again, as in FIG. 2, a commutation dip is shown as occurring between the times $t_1$ and $t_2$. Now, however, the output instead of reaching saturation, is limited at a value which is one diode drop away from the nominal value. i.e. approximately 0.7 voltage difference. These two limits are shown as broken lines on FIG. 4. Thus, the actual output voltage will always remain within $\pm D$ of the nominal voltage. Through this limitation of the change of output voltage $U_V$ of the amplifier 12 only a slight disturbance occurs on the final output $U_A$.

Since with increasing frequency $U_a$ becomes larger and $U_{19}$ becomes smaller, an upper frequency limit $f_0$ and lower frequency $f_n$ are present for a difference which is larger or smaller than the diode threshold D. By substituting into equation 1 above the relationship $U_{Vmax} = U_{19} \pm D$ the following can be obtained for the circuit according to FIG. 3:

$$f_0 = (\hat{U}_{19} + D)/(2\pi \cdot R_{13} \cdot C_{14} \cdot \hat{U}_A)$$
$$f_n = (\hat{U}_{19} - D)/((2\pi \cdot R_{13} \cdot C_{14} \cdot \hat{U}_A)$$
$$U_{19} = U_A/\sqrt{1 + (\omega \cdot R_{18} \cdot C_{19})}$$

where $R_{19}$ is the resistance of resistance 19.

The circuit according to FIG. 3 can be modified so that it is frequency dependent over a wide range and still operate with optimum interference voltage suppression. In order to accomplish this, the limitation of the output voltage $U_V$ of the amplifier 3 must be controlled in a frequency dependent manner. FIG. 5 illustrates, in block diagram form, the manner in which the circuit can so be modified. In this arrangement the integrator 17 is shown in block diagram form. Between the integrator 19 and the diodes 21 and 22 is a variable gain linear amplifier 24 having a gain control input 24a. Also shown is a function generator 25 which generates an output voltage on a line 26 which is dependent on frequency. This may simply be a conventional frequency to voltage converter. The output on line 26 is used to control the gain of the amplifier 24. This may be done in conventional manner using adjustable feedback in the amplifier. Either an element which changes its resistance as a function of voltage may be used, or alternatively the voltage on line 26 may be used as a control input to a servo system adjusting a variable feedback resistor. Through this arrangement, the gain of the linear amplifier 24 is always adjusted such that the limiting voltage is equal to the output $U_V$ of the amplifier 12. Thus, once again, the upper frequency limit of the circuit is dependent on $U_{Vmax}$, $R_{13}$ and $C_{14}$ as described in connection with equation (1), In the circuit of FIG. 5 there is no longer a lower frequency limit and the interference voltage suppression is exactly as optimum as it is in the circuit according to FIG. 3.

Thus, there have been shown arrangements for obtaining frequency independent smoothing of the synchronizing voltage over a large frequency range. The control units of the present invention can be used for frequency independent control of line commutated converters, in particular. The low cost of the components should be noted. In addition, no adjustments are necessary as was previously required using convention filters and no changes are necessary even if the line frequency is changed, for example, from 50 Hz to 60 Hz. Although specific embodiments of the invention have been illustrated and described, it will be obvious to those skilled in the art that various modifications may be made without departing from the spirit of the invention which is intended to be limted solely appended claims.

We claim:

1. In a control unit for an externally controlled, externally commutated converter which includes means having as inputs a synchronizing voltage and a variable d.c. control voltage for comparing said voltages and forming firing pulses for the converter rectifiers of the converter and smoothing means between the means forming firing pulses and the synchronization voltage input, an improved smoothing means comprising:
    a. an amplifier having as an input the synchronizing voltage;
    b. means for limiting the output of said amplifier; and
    c. a first integrator having its input coupled to the limited output of said amplifier and its output fed back to the input of said amplifier, the output of said integrator being coupled to the synchronizing voltage input of said means for forming firing pulses.

2. Apparatus according to claim 1 wherein said amplifier is a high gain amplifier which can be driven into saturation and wherein said means for limiting comprise the means in said amplifier limiting its voltage to a saturation level.

3. Apparatus according to claim 1 wherein said amplifier is an operational amplifier and wherein said synchronizing voltage is coupled to the non-inverting input of said amplifier.

4. Apparatus according to claim 1 and further including a second integrator having its input coupled to the output of said first integrator and first and second diodes in parallel with reverse polarity coupling the output of said integrator to said means for limiting.

5. Apparatus according to claim 4 wherein said second integrator comprises a resistor and capacitor in series, said resistor being coupled to the output of said first integrator and said capacitor to ground and wherein the capacity of said capacitor is chosen to be of sufficient magnitude that the voltage drop thereacross is very small as compared to the voltage at the output of said first integrator.

6. Apparatus according to claim 5 and further including a variable gain linear amplifier interposed between said second integrator and said diodes and a function generator having its input coupled to the output of said first integrator and providing an output proportional to the frequency of the output of said integrator, the output of said function generator coupled to control the gain of said variable gain amplifier.

7. Apparatus according to claim 6 wherein said function generator comprises a frequency to voltage converter.

8. Apparatus according to claim 7 wherein said amplifier is an operational amplifier and wherein said synchronizing voltage is coupled to the non-inverting input of said amplifier.

* * * * *